(12) United States Patent
Cembrano et al.

(10) Patent No.: US 10,845,770 B2
(45) Date of Patent: Nov. 24, 2020

(54) METHOD FOR GENERATING CONTROL SIGNALS ADAPTED TO BE SENT TO ACTUATORS IN A WATER DRAINAGE NETWORK

(71) Applicant: SUEZ GROUPE, Paris la Defense (FR)

(72) Inventors: Gabriela Cembrano, Barcelona (ES); Bernat Joseph Duran, Canet de Mar (ES); Joseba Quevedo, Sant Cugat del Valles (ES); Vicenc Puig, Terrassa (ES); Maria Salamero, Barcelona (ES); Joaquim Marti, Barcelona (ES); Jaume Figueras Jove, Terrassa (ES)

(73) Assignee: SUEZ GROUPE, Paris la Défense (FR)

( * ) Notice: Subject to any disclaimer, the term of this patent is extended or adjusted under 35 U.S.C. 154(b) by 63 days.

(21) Appl. No.: 15/779,742

(22) PCT Filed: Nov. 21, 2016

(86) PCT No.: PCT/EP2016/078345
§ 371 (c)(1),
(2) Date: May 29, 2018

(87) PCT Pub. No.: WO2017/093065
PCT Pub. Date: Jun. 8, 2017

(65) Prior Publication Data
US 2018/0356772 A1 Dec. 13, 2018

(30) Foreign Application Priority Data

Nov. 30, 2015 (EP) .................................. 15290295
Feb. 5, 2016 (EP) .................................. 16020030

(51) Int. Cl.
*G05B 13/04* (2006.01)
*G05B 11/32* (2006.01)

(52) U.S. Cl.
CPC ............ *G05B 13/041* (2013.01); *G05B 11/32* (2013.01); *G05B 2219/2605* (2013.01)

(58) Field of Classification Search
CPC .................. G05B 13/041; G05B 11/32; G05B 2219/2605
(Continued)

(56) References Cited

U.S. PATENT DOCUMENTS

2014/0324406 A1    10/2014  Nesbitt et al.
2016/0378123 A1*  12/2016  Montestruque ........ G05B 15/02
                                                                     700/282

OTHER PUBLICATIONS

Flood regulation using nonlinear model predictive control, By: Toni Barjas Blanco, Control Engineering Practice 18 (2010), pp. 1147-1157.*

(Continued)

*Primary Examiner* — Jigneshkumar C Patel
(74) *Attorney, Agent, or Firm* — Sughrue Mion, PLLC

(57) ABSTRACT

The inventions comprises a computer implemented method for generating control signals adapted to be sent to actuators, such as gates and pumps, in a water drainage network DN in an area, said method comprising —receiving DN data comprising one or more of DN topology of the area, rain intensity measures, water level measures, from the sensors or from an external source, —generating or receiving objective functions to optimize, —receiving a selection of a multi-objective optimization method, this multi-objective optimization preferably comprising lexicographic method or weighted sum method, —generating an optimization problem, —solving the optimization problem thereby generating the strategies to be sent to actuators in the water drainage network DN.

13 Claims, 2 Drawing Sheets

(58) Field of Classification Search
USPC .......................................................... 700/29
See application file for complete search history.

(56) References Cited

OTHER PUBLICATIONS

Integrating simulation models with a view to optional control of urban wastewater systems, By: David Butler, Environmental Modelling & Software 20 (2005), pp. 415-426.*
Toni Barjas Blanco et al., "Flood regulation using nonlinear model predictive control", Control Engineering Practice, Oct. 1, 2010, pp. 1147-1157, vol. 18, No. 10.
J. Pascual et al., "Operational Predictive Optimal Control of Barcelona Water Transport Network", Proceeding of the 18th world Congress The International Federation of Automatic Control, Aug. 28-Sep. 2, 2011, pp. 10571-10578, vol. 21, No. 8.
Carlos Ocampo-Martinez et al., "Model Predictive Control of Wastewater Systems", Springer London, Jan. 10, 2010, 31 pages.
European Search Report for Application No. EP 16020030 dated Nov. 21, 2016.
International Search Report for PCT/EP2016/078345 dated Jan. 5, 2017 [PCT/ISA/210].
Written Opinion for PCT/EP2016/078345 dated Jan. 5, 2017 [PCT/ISA/237].
Imsland et al. " Model-Based Optimizing Control and Estimation using Modelica Models", The Modelica Association, Mar. 3-4, 2008, pp. 301-310.
Communication dated Mar. 31, 2020 by the European Patent Office in application No. 16 020 030.9.

* cited by examiner

METHOD FOR GENERATING CONTROL SIGNALS ADAPTED TO BE SENT TO ACTUATORS IN A WATER DRAINAGE NETWORK

CROSS REFERENCE TO RELATED APPLICATIONS

This application is a National Stage of International Application No. PCT/EP2016/078345 filed Nov. 21, 2016, claiming priority based on European Patent Application No. 15290295.3 filed Nov. 30, 2015 and European Patent Application No. 16020030.9 filed Feb. 5, 2016.

FIELD OF THE INVENTION

The present invention relates to the methods for the control of water drainage networks. In particular it relates to a method for generating strategies or control signals adapted to be sent to actuators in a water drainage network.

BACKGROUND PRIOR ART

Combined urban drainage networks (UDN) collect and convey wastewater and storm water together. This mixed water is sent to wastewater treatment plants (WWTP), where it is treated before being released to the receiving environment. During heavy-rain events, the UDN and WWTP capacities can be easily overloaded, causing flooding and untreated water discharges to the receiving environment, known as combined sewer overflows CSO. Combined sewer overflows CSO are relief structures, called also storm-water regulators, which are constructed in combined sewer systems to divert flows in excess of the peak design flow of the sewage treatment plant.

To avoid this, modern UDNs include infrastructures, such as tanks, gates and pumps, which can provide storage during the rain events, to release water gradually to the WWTP. The infrastructure operation is performed based on a telemetry and tele control.

There is a need in the art to provide a method which is capable to respond in an automatic manner in a non-expected situation in a drainage network.

SUMMARY OF THE INVENTION

To this effect, the invention discloses a computer implemented method for generating strategies to be sent to actuators in the form for example of control signals or electrical control signals or electromagnetic control signals adapted to be sent to actuators, such as gates and pumps, in a water drainage network DN in an area, the DN comprising one or more actuators adapted to receive the generated control signals and one or more sensors, the sensors adapted to capture data comprising one or more of the DN network topology of the area, rain intensity measures, water level measures. The actuators and sensors are in communication directly or indirectly in the DN: this means that they may have direct communication or they communicate through an additional element such as a computer. The DN may comprise one or more sewers or pipes, a wastewater treatment plant WWTP and/or a combined sewer overflow CSO. A method according to the invention comprises:

receiving DN data comprising one or more of DN topology of the area, rain intensity measures, water level measures, from the sensors or from an external source, generating or receiving objective functions to optimize, receiving a selection of an optimization method, this optimization method preferably comprising lexicographic method or weighted sum method, generating an optimization problem, preferably describing: the operational goals, the current state of the network and the effect of possible strategy actions, solving the optimization problem thereby generating the strategies to be sent to actuators in the water drainage network DN.

The dynamic models comprise variables for which an objective is to be met at the optimization step. The variables may be volume, flow, rain intensity measures and water level.

Preferably, the step of solving the optimization problem is performed for generating strategies a user-specified time horizon or time frame.

Optimization problems comprise equations and restrictions.

The method steps may be performed by computer means in connection to the sensors and actuators; the computer means may also be in connection to WWTP, CSO or sewers or pipes. The method steps may be performed by the sensors and actuators locally. Data may be received and sent through electrical communication means or network or through electromagnetic communication means or network but not restricted to these type of networks.

A method according to the invention, generating or receiving a selection of objective functions to optimize, allows flexibility in terms of adaptation to different working conditions. In an example, the reception of an objective function may be made by receiving means in a computer device which is connection to the actuators or sensors in the DN. In contrast, methods of the state of the art for the generation of control signals to be sent to actuators in a DN are not adapted to receive objective functions to optimize and therefore said methods are based on static models which are not adapted to face different working conditions.

Besides a method according to the invention allows the automatic generation of strategies for actuators such as gates and pumps of DNs in real time. A method according to the invention responds according to a reception of a selection of an optimization method therefore allowing the DN to automatically react in a non-expected situation. The selection may be inserted by insertion means such as a keyboard on a computer or laptop.

The selection of an optimization method may be for the selection of a multi-objective optimization procedure or method which may take into account rain intensity predictions or DN usage statistics or pre-established preferences for particular dates. Among the possible selections, a weigh sum method provides an alternative for pre-establishing known priorities to different cost functions; for example, it is possible to pre-establish priority on avoiding diverting water to the sea and on a second level of priority it is possible to avoid streets flooding or vice versa. A lexicographic method allows giving same priority to several variables but at the same time allows optimizing one variable in a first calculation for maximum optimization and leave the others to be solved at a best optimization as possible sequentially. A further possibility is to select a Pareto optimization method.

As an alternative, the selection of an optimization method may be mono-objective: in this case, a method according to the invention may be iterated a predefined number of times so that a single objective is solved per iteration. The best value for the variables complying with the objective in an isolated manner, or without taking into account other variables, may be taken as a reference for solving a subsequent multi objective optimization procedure and test the quality of the optimization.

The water level measures may be taken from sensors and may also be taken from CSO or from the sewers with the use of limnimeters.

In an embodiment the objective functions may vary according to DN network topology data, external data such as rain predictions, a dynamic model of the DN, and a dynamic model of two or more elements, the two or more elements being at least WWTP and CSO, and comprise optimization objectives for maximizing the volume of water sent to the WWTP and for minimizing the penalty functions related to CSO and flooding. The objective may comprise maximizing or minimizing the objectives to be met at solving the optimization problem. Advantageously this embodiment provides with a global vision of the entire DN due to the dynamic model of the DN, to minimize flooding and CSO.

In an embodiment the method comprises receiving
  initial values for the dynamic model of the DN, and the dynamic model of two or more elements, the two or more elements being at least a waste water treatment plant WWTP and a combined sewer overflow CSO, and initial values of the variables of optimization,
either from a previous implementation of the method or from an external source.

Advantageously the reception of initial values allows calculating a control strategy for a first pre-established time frame, for example 30 minutes, every pre-established second time frame, for example 5 minutes. Thus, for example, it is possible to calculate optimization values for 30 minutes and correct them every 5 minutes: thus there may be 6 steps of 5 minutes for which the optimization is calculated. In an embodiment the method is iterated and values of variables calculated in each iteration are stored; in an iteration of the method, there may be 5 steps of 5 minutes for which the initial values of variables and initial values for the dynamic models may be known in an approximated manner and taken from the stored values thus accelerating the generation of control signals for said iteration. Every time that values for variables are calculated the method may keep them in a data base or memory so that the following calculation starts from a point close to the solution; in the scope of the present invention this is addressed as warm start. Warm start allows efficient optimization when performing the generation of control variables for the actuators; thus this embodiment allows reduction in time of response of actuators in a water drainage network DN. In an embodiment the warm start can be received every 5 minutes and the optimization may be calculated for the following 30 minutes.

In an embodiment the method further comprises receiving a maximum inflow which the WWTP is adapted to treat, and a working inflow. In this embodiment the dynamic model of the WWTP may comprise data regarding a maximum inflow which the wastewater treatment plant WWTP is adapted to treat and the method comprises receiving a working inflow to generate the functions to optimize.

In an embodiment of a method according to the invention the dynamic model comprises data combining the water level and flow of and an in-line storage element. This embodiment allows to compute the time lag of water passing through the elements in the WWTP. The water level allows calculating the flow which the WWTP is able to divert through several elements or sewer pipes.

In an embodiment the method further comprises the steps of:

receiving a current state of the DN from a detailed hydrodynamic simulation method or from sensors distributed along the DN, the hydrodynamic simulator comprising virtual actuators to which virtual signals may be sent,
  generating and solving optimization functions for a predefined number N of control intervals in the hydrodynamic simulation method,
  sending a first set of control signals to the virtual actuators by the hydrodynamic simulation method, and
  receiving a validation if the objectives have been reached.

These steps allow validation of the control signals before being sent to actuators. The detailed hydrodynamic simulation method may be one of the available ones known in the art such as SWMM from EPA, InfoWorks CS® from Innovyze or MIKE® from DHI or similar equivalents. The hydrodynamic simulation method allows providing a realistic approach with no need of validating the control signals in a real system before being sent to actuators and therefore in case of failure or errors a real system is not affected.

The fact of generating functions and solving optimization functions for a predefined number N of intervals, allows solving the equations for a present time and also for subsequent time frames. In an embodiment the technique warn start is implemented.

The signals are sent to the virtual actuators to validate whether the configuration as set out in the DN which is optimized—or to be optimized by the method—will in fact meet the objectives proposed. The validation is complete if the objectives are met, for example if the spills on sea water have been minimum. An embodiment of a method according to the invention implementing the above indicated steps allows checking the optimization before functioning in a real system.

In an embodiment the dynamic model of the sewer comprises delays according to the sewer geometry. In an embodiment geometry comprises slope and length of sewers in the DN. Depending on the grade of the slope the water may take different delays to reach deposits. The delays may be based on experimental studies. The experimental studies may be received from a database or from a detailed hydrodynamic simulation method.

In an embodiment the two or more elements further comprise a detention tank and the dynamic model of the DN comprises data regarding the detention tanks.

In an embodiment the objective functions
  vary according to DN network topology data, external data such as rain predictions, a dynamic model of the DN, and a dynamic model of two or more elements, the dynamic models comprising variables,
  and comprise optimization objectives for maximizing the volume of water sent to the WWTP and minimizing the penalty functions related to CSO and flooding.

The above indicated method embodiments described herein may be combined in any combination, except mutually exclusive combinations.

In a second aspect of the invention, there is provided a system for generate strategies adapted to be sent to actuators in a water drainage network DN, the system comprising
  one or more actuators adapted to receive the generated control signals,
  one or more sensors, the one or more sensors adapted to capture data comprising one or more of the DN network topology of the area such as rain intensity measures, water level measures,
  the actuators and sensors in communication in the DN,
  a computing device comprising a processor;

communication links between sensors, actuators and the computing device wherein the computing device comprises:
- a DN data receiver adapted to receive data from the one or more sensors, the DN data comprising one or more of DN network topology, rain level measures and flow measures,
- a generation module adapted to generate functions to optimize and to generate an optimization problem
- receiving means for receiving objective functions to optimize and for receiving a selection of a multi-objective optimization method,
- an optimization solver adapted to optimize the optimization problem, the computing device adapted thereby to generate strategies by implementing a method according to the first aspect of the invention.

The computing device comprising a processor may be integrated in one or more sensors or actuators or may be an independent device, such as a mobile device or a computer.

In an embodiment the system comprises
- one or more sewers;
- two or more elements the two or more elements being at least
  - a wastewater treatment plant WWTP,
  - a combined sewer overflow CSO,
- one or more sensors linked to the sewers and to the two or more elements, the sensors adapted to capture data comprising one or more of the DN network topology of the area, rain intensity measures, water level measures,
- a computing device comprising a processor;
- communication links between the one or more sensors and the computing device.

In an embodiment a system according to the invention comprises a detention tank and the computing device is further adapted to generate control signals when implementing a method according to the first aspect of the invention.

The receiving means for receiving objective functions to optimize and for receiving a selection of a multi-objective optimization method may comprise means for associating an objective function to one or more elements, actuators or sensors.

In a third aspect of the invention there is provided a computer program product, which may be stored on a computer-readable medium, for generating strategies or control signals adapted to be sent to actuators in a drainage network, for example a urban water drainage network, said computer program product comprising code instructions for executing a method according to the first aspect of the invention.

In an embodiment the computer program product may be stored in sensors or actuators.

BRIEF DESCRIPTION OF THE DRAWINGS

The invention will be better understood and its various characteristics and advantages will emerge from the following description of a number of exemplary embodiments and its appended figures in which.

DETAILED DESCRIPTION OF THE INVENTION

Figure 1:
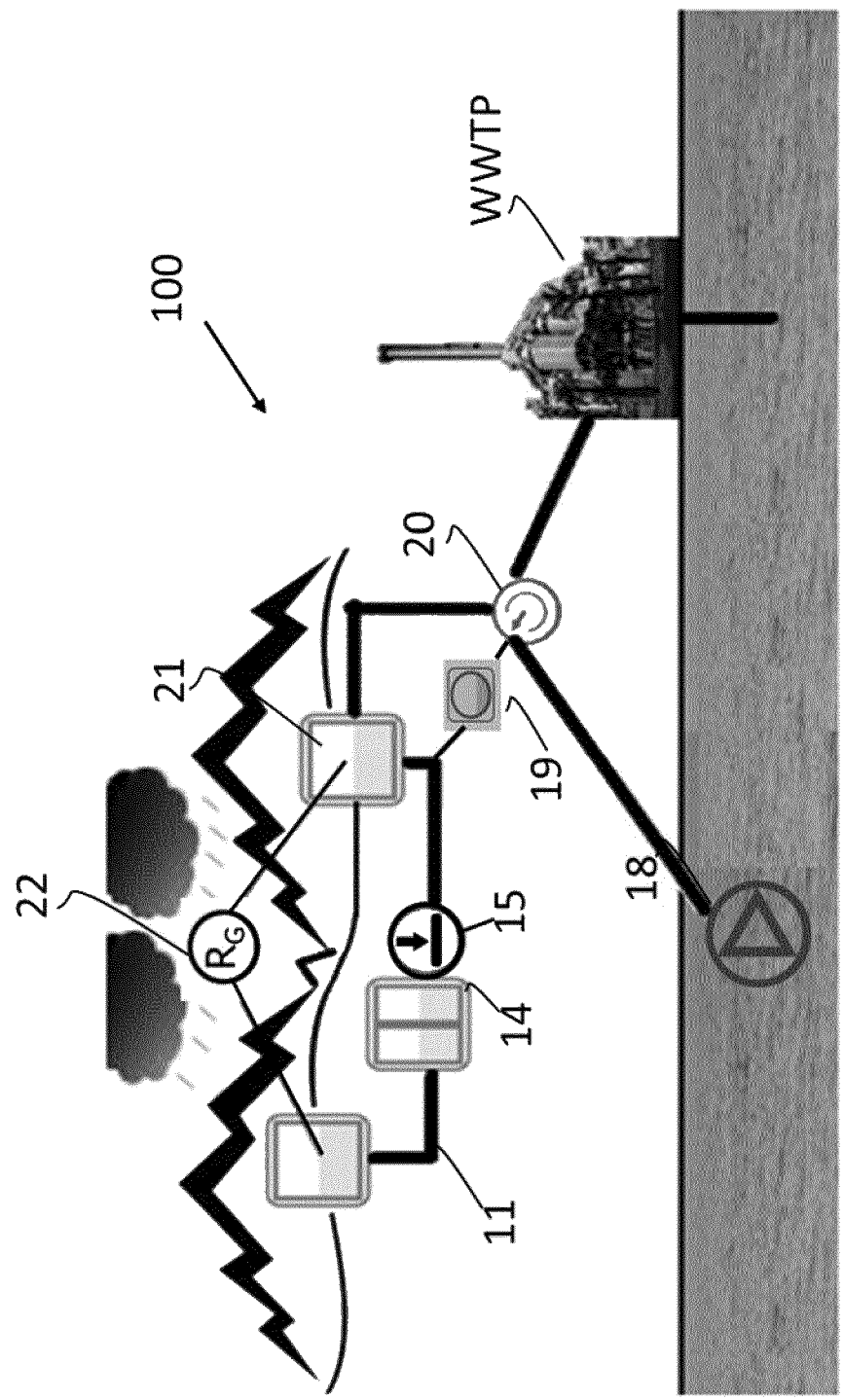
FIG. 1 displays an example of a water drainage network comprising a set of sensors and actuators according to the invention.

In this specification, the invention will be described by way of examples related to generation of control signals adapted to be sent to actuators in a water drainage network.

Model

The dynamic models use variables which describe the state of a DN and the effect of control actions thereupon. The variables may be volume, flow, water level and rain intensity. The objective functions may be mathematical representations of the operational objectives to be met, such as minimization of CSO.

In an embodiment the method comprises receiving a maximum inflow which the WWTP is adapted to treat, and a working inflow. In this embodiment the dynamic model of the WWTP comprises data regarding a maximum inflow which the wastewater treatment plant WWTP is adapted to treat and the method comprises receiving a working inflow to generate the functions to optimize. The method has the advantage of optimal calculation depending on circumstances: for example, in case of changes in availability of sewers, tanks or actuators due to maintenance works or malfunction, the method computes optimal strategies at the specific current conditions of the network.

An embodiment allows computing rain intensity forecasts or receiving these data from an external source.

As a difference with the state-of-the-art methods to generate control signals adapted to be sent to actuators in a DN, this embodiment allows a better representation of a real DN, therefore providing control signals which are more likely to meet expected objectives. Technically this implies the non-linear modelling of the DN having into account at the same time variables such as the water level in the elements of the DN and the flow. In particular in an embodiment the variables: flow and water level or height are taken into account simultaneously; the existence of delays of the transport of water may also be taken into account in sewers.

Model Predictive Control/Optimization

A method according to the invention, generating or receiving a selection of objective functions to optimize, allows flexibility in terms of adaptation to different working conditions. In an example, the reception of an objective function is made by means of receiving means in a computer device which is connection to the actuators or sensors in the DN.

The fact of generating functions and solving optimization functions for a predefined number N of intervals, allows solving the equations for a present time and also for subsequent time frames.

A method according to the invention responds according to a reception of a selection of an optimization method therefore allowing the DN to automatically react in a non-expected situation. The selection may be generated by a computer implemented method for the selection of a multi-objective optimization procedure which may take into account rain intensity predictions or DN usage statistics or pre-established preferences for particular dates. The selection may be inserted by insertion means such as a keyboard on a computer or laptop. Among the possible selections, a weighted sum method provides an alternative for pre-establishing known priorities to different cost functions; for example, it is possible to pre-establish priority on avoiding diverting water to the sea and on a second level of priority it is possible to avoid streets flooding or vice versa. A lexicographic method allows prioritizing objectives by solving one-objective problems sequentially. A further possibility is to select a Pareto multi-objective optimization method.

As an alternative, the objective optimization procedure may be mono-objective.

Advantageously the reception of initial values allows calculating a control strategy for a first pre-established time frame, for example 30 minutes, every pre-established second time frame, for example 5 minutes. Thus, for example, it is possible to calculate optimization values for 30 minutes and correct them every 5 minutes: thus there may be 6 steps of 5 minutes for which the optimization is calculated.

In an embodiment the method is applied iteratively every pre-established second time frame, e.g. 5 min and values of variables calculated in each iteration are stored. Then, every 5 min, there may be 5 future steps of 5 minutes for which the initial values of variables and initial values for the dynamic models may be known in an approximated manner and taken from the stored values thus accelerating the generation of control signals for this time.

SCADA/Telemetry

The water level measures may be taken from the sewers, the tanks, the weirs or other elements with the use of sensors or limnimeters.

In FIG. 1 a system 100 is represented which comprises a water drainage network DN. In the system 100 a computing device may be integrated in sensors or actuators and may be adapted to generate control signals when implementing a method according to the invention. The computing device comprises receiving means adapted to receive one or more objective function to optimize. The receiving means may comprise means for associating an objective function to one or more elements, actuators or sensors.

The system 100 in an example may be a urban drainage network UDN and comprises the elements:

Sewers (11): The dynamic model of the sewer (11) may be a linear representation of the water transport flow dynamics in a sewer. It may contain delays, depending on the geometry of the sewers, such as length and inclination in an installation, and the rain intensity. The sewers (11) may delay the water coming from an entry point (111) to an exit point (112).

Detention tank (14): The dynamic model of the detention tanks (14) may describe the dynamics of storage in a detention tank, taking into account the geometry, the level of stored water and the flows going into and out of the tank. The detention tanks are included in the dynamic model of a method according to the invention for taking into account emergency situations in which it is necessary to store big quantities of water.

Weirs (20) or overflow by flow or water level: The dynamic model of the weir (20) may be a nonlinear mathematical representation of the effect of a passive detention barrier on the flow, which consists of distributing or diverting the excess flow when the water level reaches a certain physical limit. The dynamic model of the weirs (20) may also include level parameters as well as flow parameters; thus the distribution of water is not only calculated with regard to the flow but also with regard to the level of the gates of the weirs.

Gates (15): The dynamic model of the gates (15) may comprise the effect of the flows through the gates; said flows may be modelled as variables for which an objective is to be met at the optimization step of a method according to the invention. The variables may be modelled as continuous variables within a range of admissible values.

Pumps (18): The dynamic model of the pumps (18) may comprise the effect of the flows through the pumps. Said flows may be modelled as variables for which an objective is to be met at the optimization step of a method according to the invention. The flows through the pumps are control variables. They may be modelled as continuous variables within a range of admissible values.

In-line storage sewer (19): The dynamic model of the in-line storage sewer (19) may comprise the dynamics of water storage phenomena occurring in large sewer mains or collectors, especially when a gate (15) controls the outflow. The model may take into account flows and levels along the in-line storage sewer (19) by a set of linear equations. Advantageously this allows modelling the capacity of the sewers which may be capable of storing water and thus allows counting quantities of water which are stored in the sewers if a gate is closed. The dynamic model of the in-line storage sewer (19) may also include level parameters as well as flow parameters; thus the distribution of water is not only calculated with regard to the flow but also with regard to the level of the gates of the in-line storage sewer (19). This provides a double vision of a sewer as a conveyor element and an storage element.

Wastewater treatment plants WWTP: The dynamic model of the WWTP may comprise a model similar to a sink in the DN, with a constant capacity.

CSO: The dynamic model of the may comprise the identification of excess water which the WWTP is not capable of treating and generates an increasing penalty function of this excess flow, to be minimized in the strategy optimization process.

The system may also comprise a virtual Tank as an example of an inflow element, for example a rain inflow element. The dynamic model of the virtual tanks may comprise a linear representation of a hydrologic rainfall runoff phenomena in a catchment. A virtual tank is an element representing at least one of collection, storage and transport dynamics of a section of a drainage network DN using a tank model.

The procedure to model the dynamics of the specific elements of DNs for the purpose of computing control strategies in a way that is representative of the complex hydraulic/hydrologic phenomena occurring in the system, but also simple enough to guarantee fast computation.

A method according to the invention may receive a set of elements through a GUI and generate therefrom the dynamic model for each of them and also for the entire DN. A set of equations may be generate linking the elements together. A step for the validation of continuity may be implemented by a method according to the invention.

A method for modelling operational goals for minimizing flooding and CSO may be combined with the goals of maximizing with WWTP usage, and may also be combined with the goal of providing smooth control actions; the smooth control actions may comprise strategies such as sending control signals for actuators every time frame over a predetermined threshold. Smooth control actions avoids changing the status of actuators abruptly, in order to prevent damaging the actuators.

The user-defined priorities of said goals are also modelled by a method according to the invention and optionally, said method allows a user to customize a performance.

In an embodiment a method according to the invention generates code to be sent automatically to a solver in an optimization library, for example GAMS.

The invention is not restricted to these examples and can be applied to the generation of any control signals in a water drainage system.

FIG. 1 displays an example of a water distribution system 100 comprising a set of actuators:
- a weir overflow by flow 20, attached to
- a waste water treatment plant WWTP, to the sea and to a basin 21 by means of sewers 11,
- said basin 21 in connection to a detention gate 15 which is adapted to receive flow from
- a detection tank 14, said detection tank 14 connected to a second basin 21 by means of a sewer 11,
- a rain gauge 22 may measure the water level in the tanks.

A method according to the invention may be implemented by computer means:
- in connection to the actuators represented in a non-limiting manner in FIG. 1 and
- adapted to send control signals to said actuators, so that an optimal control of CSO is performed.

The system 100 may comprise
- one or more virtual tanks,
- one or more detention tanks,
- one or more basins,
- one or more nodes,
- one or more overflow or overflow by flow,
- one or more overflow by water level
- one or more inline storage sewer,
- one or more detention gates,
- one or more diversion gates,
- one or more pumps,
- one or more rain gauges,
- one or more limnimeters,
- one or more receiving environment, for example the sea,
- one or more sewers,
- one or more waste water treatment plant WWTP.

Figure 2:
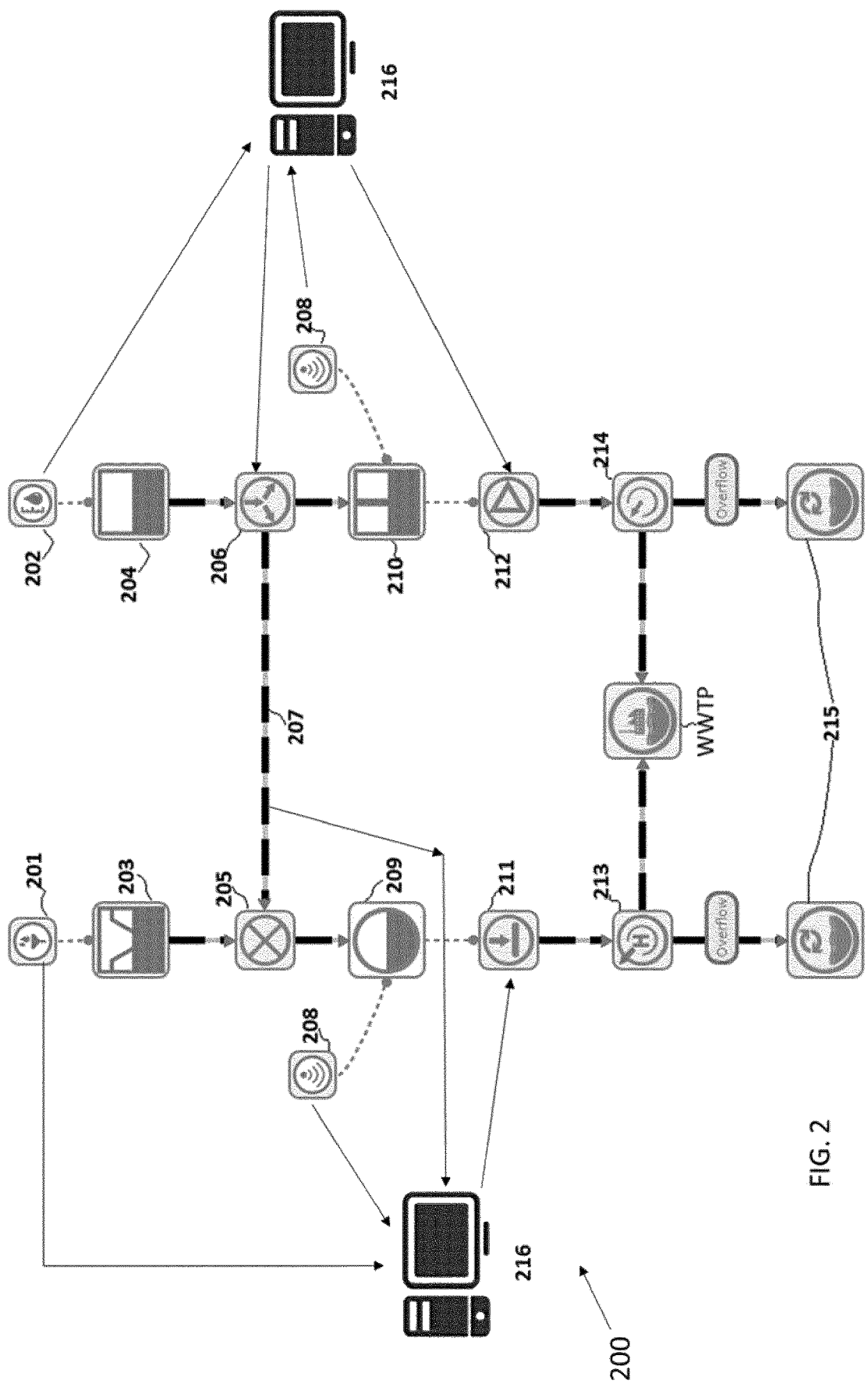
FIG. 2 is a schematic view of a system according to the invention.

FIG. 2 shows an example of a system according to the invention. The arrows represent the direction of communication; the scheme of FIG. 2 comprises:
- a node 205 adapted to connect different sewers and elements,
- passive or hydraulic elements:
  - an overflow by height 213,
  - an overflow by flow 214.
  - a virtual tank 203,
  - a basin 204,
  - sewer 207,
  - inline storage 209,
  - a detention tank 210,
  - a waste water treatment plant WWTP and a receiving environment 215,
- sensors adapted to send measures or signals to computing means 216:
  - a rain gauge 201,
  - a flow meter 202,
  - a limnimeter 208 in connection to an inline storage 209,
  - a limnimeter 208 in connection to a detention tank 210,
  - sensors distributed along the sewers 207,
- and actuators adapted to receive control signals from the computing means 216:
  - a diversion gate 206
  - a detention gate 211,
  - a pump 212.

The control signals may comprise instructions to: open, close, move to a determined position, etc.

For reasons of clarity, the computing means 216 of FIG. 2 are represented as two entities, but they may be the same entity or object or processing means, or may be entities working in the cloud or communicated between them.

Calibration/Validation

A method according to the invention may further comprise the steps of:
- receiving a current state of the DN from a detailed hydrodynamic simulation method or from sensors distributed along the DN, the hydrodynamic simulator comprising virtual actuators to which virtual signals may be sent,
- generating and solving optimization functions for a pre-defined number N of control intervals in the hydrodynamic simulation method,
- sending a first set of control signals to the virtual actuators by the hydrodynamic simulation method, and
- receiving a validation if the objectives have been reached.

The signals are sent to the virtual actuators to validate whether the configuration as set out in the DN which is optimized—or to be optimized by the method—will in fact meet the objectives proposed. The validation is complete if the objectives are met, for example if the spills on sea water have been minimum. An embodiment of a method according to the invention implementing the above indicated steps allows checking the optimization before functioning in a real system.

In an embodiment the dynamic model of the sewer comprises delays according to the sewer geometry. In an embodiment geometry comprises slope and length of sewers in the DN. Depending on the grade of the slope the water may take different delays to reach deposits. The delays may be based on experimental studies. The experimental studies may be received from a database or from a detailed hydrodynamic simulation method.

The invention claimed is:

1. A computer implemented method for generating strategies to be sent to actuators such as gates and pumps in a water drainage network (DN), the DN comprising:
   one or more actuators adapted to receive generated control signals,
   one or more sensors, the one or more sensors adapted to capture data comprising one or more of a DN network topology of an area,
   the actuators and sensors in communication in the DN,
   said method comprising:
      generating a dynamic model for the entire DN from a set of elements received through a graphical user interface (GUI),
      receiving DN data comprising one or more of DN topology of the area, rain intensity measures, water level measures, from the sensors or from an external source,
      generating or receiving objective functions to optimize performance of the DN according to the generated dynamic model of the DN,
      receiving a selection of a multi-objective optimization method,
      generating an optimization problem,
      solving the optimization problem thereby generating the strategies to be sent to the actuators in the water drainage network DN;
   wherein the objective functions:
      vary according to DN network topology data, external data, a dynamic model of the DN, and a dynamic model of two or more elements, the dynamic models comprising variables;

comprise optimization objectives for maximizing the volume of water sent to a waste water treatment plant (WWTP) and minimizing penalty functions related to combined sewer overflow (CSO) and flooding.

2. A method according to claim 1, comprising receiving initial values for the dynamic model of the DN, and the dynamic model of two or more elements, the two or more elements being at least the WWTP and the CSO, and initial values of the variables of optimization, either from a previous implementation of the method or from an external source.

3. A method according to claim 2, further comprising receiving a maximum inflow which the WWTP is adapted to treat, and a working inflow.

4. A method according to claim 1, wherein the dynamic model of the DN comprises data combining a level and flow of an inline storage element.

5. A method according to claim 1, further comprising the steps of:

receiving a current state of the DN from a detailed hydrodynamic simulation method or from sensors distributed along the DN, the hydrodynamic simulator comprising virtual actuators to which virtual signals may be sent, generating and solving optimization functions for a predefined number N of control intervals in the hydrodynamic simulation method, sending a first set of control signals to the virtual actuators by the hydrodynamic simulation method, and receiving a validation if the objectives have been reached.

6. A method according to claim 1, wherein the dynamic model of the sewer comprises delays according to sewer geometry.

7. A method according to claim 1, wherein the two or more elements further comprise a detention tank and wherein the dynamic model of the DN comprises data regarding the detention tanks.

8. A system for generate strategies adapted to be sent to actuators in a water drainage network DN, said DN comprising:

one or more actuators adapted to receive the generated control signals, one or more sensors, the one or more sensors adapted to capture data comprising one or more of the DN network topology of the area, the actuators and sensors in communication in the DN, a computing device comprising a processor;

communication links between sensors, actuators and the computing device wherein the computing device comprises:

a DN data receiver adapted to receive data from the one or more sensors, the DN data comprising one or more of DN network topology, rain level measures and flow measures, a generation module adapted to generate functions to optimize and to generate an optimization problem, an optimization solver adapted to optimize the optimization problem and adapted thereby to generate strategies by implementing a method according to claim 1; and a GUI;

wherein the computing device is configured to receive objective functions to optimize and to receive a selection of a multi-objective optimization method.

9. A computer program product comprising a non-transitory computer readable medium storing code instructions that, when executed by a processor, generate control signals adapted to be sent to actuators in a drainage network DN for executing the method according to claim 1.

10. The method according to claim 1, wherein the DN network topology of the area includes one or more of rain intensity measures and water level measures.

11. The method according to claim 1, wherein the multi-objective optimization comprises a lexicographic method or a weighted sum method.

12. The method according to claim 1, wherein the external data comprises rain predictions.

13. The computer program product according to claim 9, wherein the DN is an urban water drainage network.

* * * * *